July 19, 1966

H. G. STULTS 3,261,416

WEIGHER-CONTROLLED FEED DISPENSING DEVICE PROVIDING
PREDETERMINED FEEDING SCHEDULE

Filed Feb. 14, 1964

INVENTOR:
HOWARD G. STULTS
BY Charles B. Haverstick
ATTORNEY.

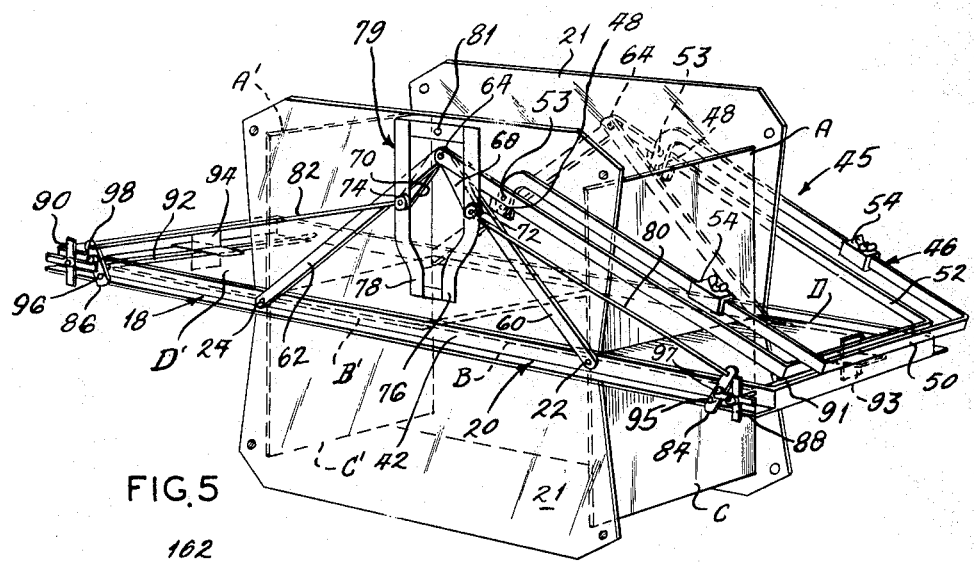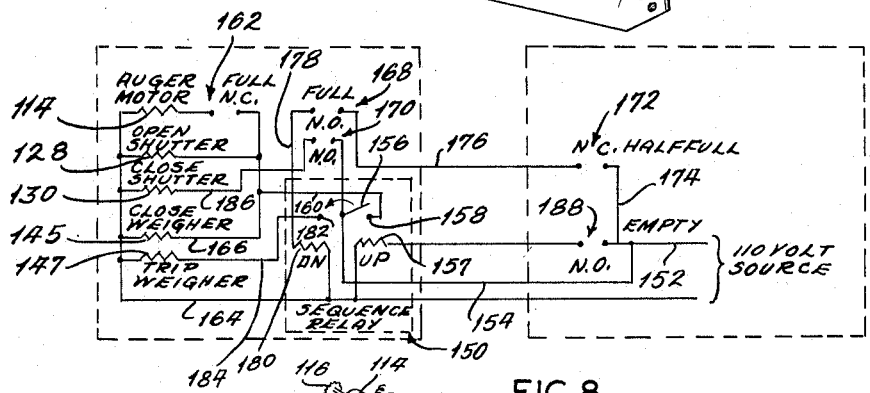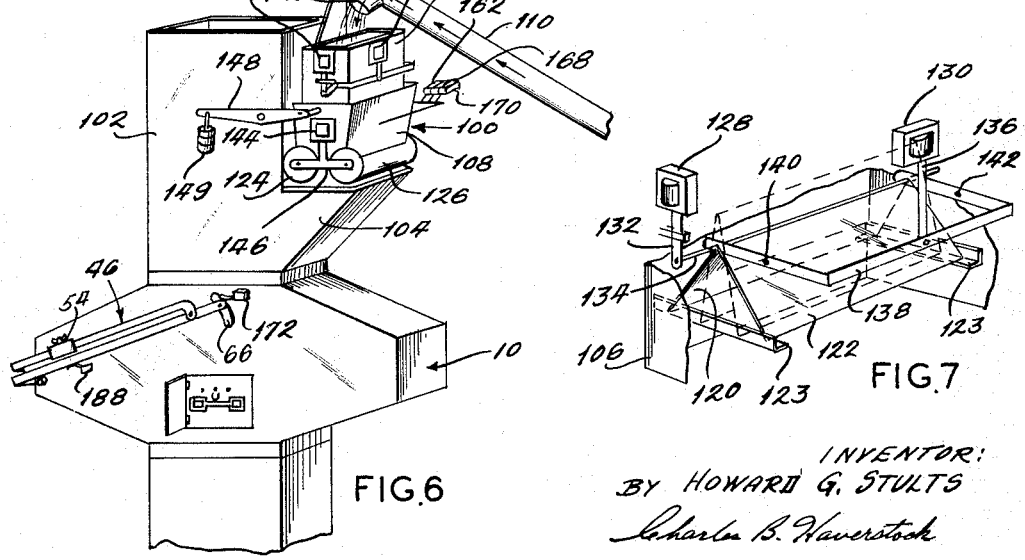

United States Patent Office 3,261,416
Patented July 19, 1966

3,261,416
WEIGHER-CONTROLLED FEED DISPENSING DEVICE PROVIDING PREDETERMINED FEEDING SCHEDULE
Howard G. Stults, Hettick, Ill.
Filed Feb. 14, 1964, Ser. No. 344,926
15 Claims. (Cl. 177—114)

The present invention relates generally to weighing and feeding devices and more particularly to a combination weighing and feeding device for feeding livestock and the like.

Many devices have been constructed and used in the past for feeding livestock, and some have included means for feeding measured quantities of feed. Existing devices, however, vary widely in construction and operation and most of the existing devices require frequent attention and adjustment and many require considerable manual labor and relatively skilled personnel to operate. So far as is known, no one has heretofore devised or constructed a livestock feeding device which is fully automatic, which weighs predetermined amounts of feed, and which feeds the measured quantities at predetermined time intervals. Furthermore, no known device also includes means for blending and mixing different feeds and feed supplements to achieve the most desirable feed mixture. Still further, it has been the usual practice heretofore to feed relatively large quantities at relatively infrequent intervals to reduce the labor and time required in the feeding of animals. This practice, however, usually does not achieve the most desirable or efficient use of the feed and does not result in the best feeding schedule for the animals. In recent years, the trend has been to feed smaller amounts at more frequent intervals in order to get the most efficient use of the feed and also to provide a better feeding schedule. It is obvious, however, that more frequent feeding, especially if it is done manually, will require considerably more labor in the mixing, blending and distribution of the feed thereby substantially increasing the labor cost and also results in more waste of the feed.

These and other disadvantages and shortcomings are inherent in all of the known methods and devices for feeding animals and are overcome by the present invention which teaches the construction and operation of a novel feed weigher device which can be regulated to feed at any desired time intervals and which includes means for automatically mixing, blending, weighing and feeding the animals. Furthermore, the subject device can be made fully automatic requiring only relatively infrequent attention by a relatively unskilled operator, as for example, when new supplies of bulk feed and feed supplements are required and for normal maintenance and cleaning.

It is therefore a major object of the present invention to provide improved means for feeding livestock.

Another object is to provide improved means for mixing, weighing, blending and feeding substances to animals.

Another object is to provide means for feeding animals according to the most desirable feeding schedule.

Another object is to provide animal feeding means which are fully automatic and may include means for mixing feed supplements with bulk feed materials to obtain the most desirable feed mixture thereof.

Another object is to provide improved feed weighing means which are adjustable to change the amount of feed weighed thereby.

Another object is to reduce the cost of feeding farm animals and the like.

Another object is to increase the meat producing efficiency of animal feeds and the like.

Another object is to provide animal feed means capable of being adjusted to produce the most desirable feeding schedule for a particular kind of animal.

Another object is to provide means whereby a portion of the main bulk feed is weighed before one or more supplements are added thereto.

Yet another object is to minimize waste of materials used for feeding animals.

These and other objects and advantages of the present invention will become apparent after considering the following detailed specification covering several preferred embodiments of the device in conjunction with the accompanying drawings, wherein:

FIG. 5 is an enlarged perspective view showing the operating mechanism for the feeding and weighing portions of the subject device;

FIG. 6 is a perspective view showing the subject feed weighing device in combination with an auxiliary feed weighing device;

FIG. 7 is an enlarged perspective view showing a portion of the operating mechanism for the auxiliary feed weighing device of FIG. 6; and FIG. 8 is a schematic wiring diagram of a typical control circuit for the subject device.

Figure 2:
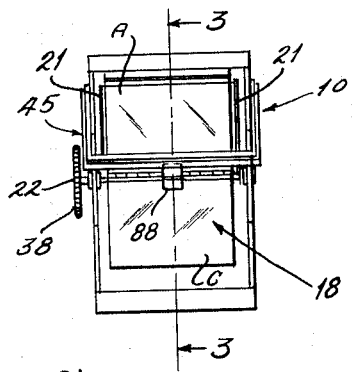
FIG. 2 is a right end elevational view of the device shown in FIG. 1.

Referring to the drawings more particularly by reference numbers, the number 10 refers to a feed weigher device constructed according to the present invention. The device 10 includes a housing 12 with an inlet feed tube or chute 14 on the top and an outlet chute 16 on the bottom. The inlet chute 14 is adapted to be connected to a controlled source of feed material such as a silo with an auger feed connected thereto, and the outlet chute 16 is adapted to be connected to or positioned above a feed trough or manger into which it discharges measured quantities of feed at predetermined time intervals. The housing 12 may, if desired, be open on the ends as shown in FIG. 2.

Figure 3:
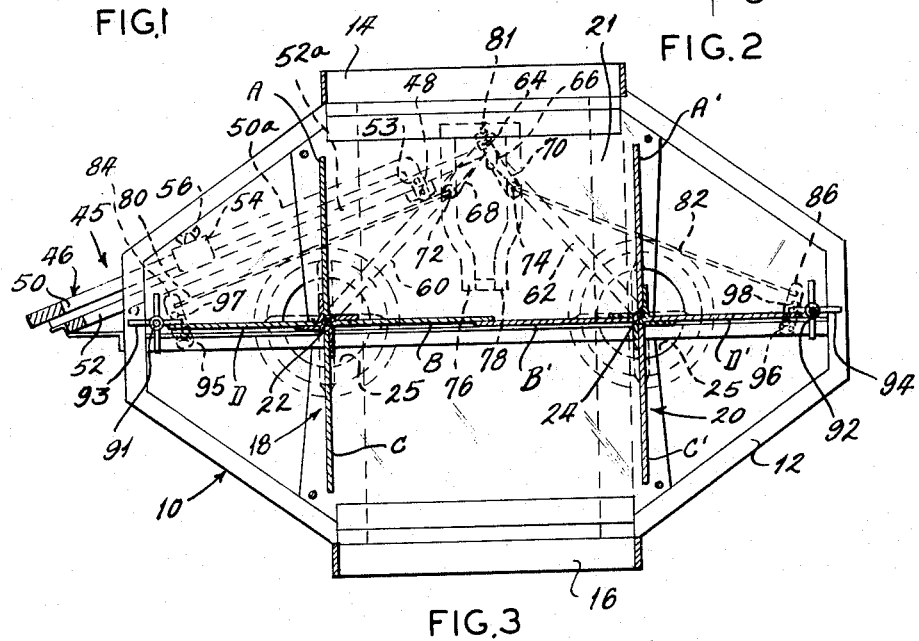
FIG. 3 is an enlarged cross-sectional elevational view taken along line 3—3 of FIG. 2.

Two rotatable assemblies 18 and 20 are mounted inside the housing 12 in the positions shown in FIG. 3. Each assembly 18 and 20 has a four bladed paddle wheel structure with the blades on one structure identified as blades A, B, C, and D, and the blades on the other structure identified as A', B', C', and D'. In the unloaded condition two blades on each structure are substantially horizontal and the other blades are vertical. In this position, two of the blades, blades B and B' in FIG. 3, extend across the space immediately below the feed chute 14. The space above the blades B and B' and below the feed chute is further defined by the vertical blades A and A' and by wall members 21 which are spaced inwardly from the opposite side walls of the housing 12. The space thus defined receives and temporarily retains feed that falls on the blades B and B' from the controlled feed source. In the usual situation this is bulk feed such as ensilage and it may also include one or more feed supplements which are added to the bulk feed in a manner that will be described in detail hereinafter.

The assemblies 18 and 20 are positioned in the housing 12 and are rotatably supported therein on shafts 22 and 24 respectively which extend outwardly through enlarged openings 25 in the side walls of the housing. The assemblies are also supported in the housing by a weighing mechanism which will be described later. The assembly blades A and C and A' and C' are rotatable on their respective shafts 22 and 24 relative to the blades B and D and B' and D' also on the same shafts. In other words, each assembly 18 and 20 includes two relatively movable blade members, one of which is fixedly connected to its associated shaft and the other of which is rotatably supported on said shaft so that the two blade members of each assembly can move relative to each other. This allows for an increase in cubic capacity during unloading of the device 10 and avoids undesirable compacting of the materials being weighed. It is not essential that the blades on each of the assemblies be relatively movable although this has been found to be the preferred construction.

Figure 1:
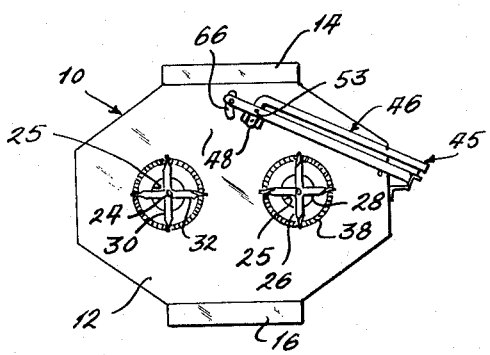
FIG. 1 is a side elevational view of a feed weigher device constructed according to the present invention.

The assembly shafts 22 and 24 extend through the side wall openings 25 and at least one end of each of the shafts 22 and 24 carries a pair of cross arm members, one of which is connected to each of the relatively movable assembly blades. In FIG. 1 the cross arm members on the shaft 22 are members 26 and 28, and the cross arm members on the shaft 24 are members 30 and 32. The ends of the cross arm members 26 and 28 and 30 and 32 are provided with holes which receive annular rod members 34 and 36 respectively that extend therearound, and springs 38 and 40 are respectively positioned on each of the rods 34 and 36. Each of the springs 38 and 40 has four equal portions positioned between and engaged by the adjacent ends of the arm members, and the springs 38 and 40 provide forces between the ends of the arm members to maintain the arms, and the associated assembly blades, in a normally perpendicular relationship as illustrated in solid outline in FIG. 4. The blades of each assembly, however, are capable of temporarily losing their perpendicular relationship after being tripped during an unloading operation as will be described later.

The assembly shafts 22 and 24 are mounted on a rectangular frame structure 42 which is positioned in the housing 12 and maintained in a suspended condition therein by the weighing mechanism 45 shown in FIGS. 3 and 5. The weighing mechanism 45 includes a U-shaped assembly 46 which is pivotally supported on the housing 12 by pivot shafts or studs 48, one of which is attached to each opposite side wall of the housing. The assembly 46 includes a first pivotal frame structure 50 which has arm portions that are pivotal on the studs 48, and a second pivotal frame structure 52 which is positioned under the first frame structure 50 and is pivotal relative thereto on other shafts or studs 53 which are attached to the first frame structure 50. The two frame structures 50 and 52 are therefore movable relative to each other and also to the housing 12, and the frame structure 50 also carries slidable weight members 54 which are adjustable to change the amount of feed weighed by the device during each operating cycle. The weights 54 are adjusted on the frame 50 by wing nuts 56 or other similar means.

The weigher arm assembly 46 extends around one end of the housing 12, and the frame structures 50 and 52 each have two arm portions. The arm portions 52a of the structure 52 extend to the centers of the opposite side walls of the housing beyond the pivotal shafts 53. It is possible to locate the shafts 53 in other positions, however, including positions coinciding with the centers of the opposite walls of the device. The ends of the arm portions 52a are pivotally connected to other arm members or struts 60 and 62 which are connected at their opposite ends to the rectangular frame structure 42 adjacent to the shafts 22 and 24. Similar struts 60 and 62 are provided at each opposite side of the housing 12, and in combination with the weighing means movably support the assemblies 18 and 20 in the housing during loading and unloading thereof. The second frame structure 52 is connected by shafts 64 to the upper ends of the struts 60 and 62, and the shafts 64 extend through curved elongated openings or slots 66 in the side walls of the housing 12 as shown in FIG. 3. This enables the weighing assembly 46 including the frame structures 50 and 52 to swing upwardly in opposition to downward pressure of a load on the assemblies 18 and 20 during loading thereof.

The shaft 64 on one side of the housing is also engaged with the upper ends of other struts 68 and 70 which control release mechanisms for releasing the assemblies when a predetermined amount or weight of feed has accumulated thereon. The lower opposite ends of the struts 68 and 70 have rollers 72 and 74 respectively mounted thereon, and the rollers 72 and 74 move along curved guide members or tracks 76 and 78 which are part of another structure 79 that is pivotally attached to the housing at 81. The structure 79 is pivoted to the housing 12 because of the fact that the pivot shafts 64, which support the assemblies 18 and 20, move along curved paths and would otherwise cause uneven movement of the rollers 72 and 74 in the associated guides 76 and 78.

The lower ends of the struts 68 and 70 are also connected respectively to other elongated members 80 and 82 which extend to adjacent the opposite ends of the housing 12 and are pivotally connected to operator members 84 and 86. The operator members control other mechanisms which release the assemblies 18 and 20 when a predetermined load condition is reached so that the load can fall into the outlet 16.

Bulk feed is fed to the subject device by controlled feed means such as an auger or the like, and falls onto the two assembly blades B and B' which are closing the space below the inlet 14 as already stated. As more and more feed falls on the blades B and B', the suspended assemblies 18 and 20 and the support frame 42 therefor move downwardly in opposition to the counterbalance effect of the weighing mechanism 46. However, because the outer ends of the blades D and D' are maintained in locked condition rotation of the assemblies cannot take place. As the assemblies 18 and 20 and the supporting frame 42 continue to move down under increasing load, the rollers 72 and 74 will move downwardly along their associated guide members 76 and 78. Because of the shape of the guide members 76 and 78 as shown in FIGS. 3 and 5, however, and because the guide members are pivoted to the housing 12 at 81, downward movement of the rollers 72 and 74 will eventually move the elongated members 80 and 82 toward each other and in so doing will rotate the operator members 84 and 86 in a direction to release the assemblies 18 and 20. Each release means includes a four bladed member 88 and 90 mounted respectively on shafts 91 and 92. Other four bladed members 93 and 94 are also mounted respectively on the shafts 91 and 92 and in their locked condition engage the horizontal blades D and D' of the assemblies 18 and 20 to prevent rotation thereof. The shafts 91 and 92 are also rotatably mounted on the frame 42 and move up and down therewitth. When a load is released (FIG. 4) the horizontal blade members, shown as blades D, B, and D', B' will rotate downwardly with respect to their overlapping ends thereby creating an opening in the bottom of the receiving cavity and at the same time increasing the volume of said cavity. The vertical blades of the assemblies, however, may or may not move together and downwardly at the start of the tripping cycle depending upon the type of material being weighed. However, as the contents are discharged the added compression in the two springs 38 and 40 will force the vertical blades a final quarter cycle to form the bottom of the receiving cavity for the next filling operation. Likewise at the finish of the discharge cycle, all rotating blade members will be restored to their normal relationship with one another. Therefore during an unloading operation the assemblies 18 and 20 rotate a quarter revolution and automatically become relocked in readiness for the next cycle. The locking mechanisms are able to reengage the assemblies after an unloading operation because the assemblies are then much lighter and are therefore lifted upwardly by the counterbalancing action of the weighing mechanism 46. This action also moves the rollers 72 and 74 upwardly in the associated guides 76 and 78. At the same time, the springs 38 and 40 automatically restore the blades of each assembly to a perpendicular relationship.

It should now be noted that the connection between the weigher frame structures 50 and 52 is an overcenter connection which during loading reaches an overcenter condition and trips or releases the assemblies 18 and 20. The release of the assemblies 18 and 20 takse place with a rapid snap action in which the blade members of each assembly may move relative to each other to prevent undesirable compacting of the feed materials during discharge as already mentioned. An actual unloading operation takes place so rapidly that it is difficult to follow the motion of the operating parts with the eye.

The release means for the assemblies 18 and 20 are shown in FIGS. 3 and 5 and include relatively small four bladed members 88 and 90 which are rotatably mounted at opposite ends of the same side of the housing on the shafts 91 and 92. The operating members 84 and 86 for the release means are pivotably mounted on other shafts 95 and 96 respectively. In the locked condition, studs 97 and 98, on the operator members 84 and 86 respectively, engage blades of the members 88 and 90 and prevent them from turning. This in turn prevents the four bladed members 93 and 94 from turning and releasing the assemblies 18 and 20, and the assemblies 18 and 20 are therefore prevented from rotating. As the load on the assemblies 18 and 20 increases, however, the rollers 72 and 74 move downwardly in their respective guides 76 and 78, and in so doing the operating members 84 and 86 and their associated studs 97 and 98 move in a direction to eventually release the members 88 and 90 and the assemblies 18 and 20 to allow the weighed material to fall into the output hopper 16.

The adjustable weights 54 which are mounted on the arms 50a of the frame structure 50 can be slid back and forth and locked in any desired positions depending on how much load is to be allowed to accumulate during each operating cycle. For example, when the weights 54 are positioned relatively near to the pivot shafts 48 relatively small loads will be allowed to accumulate, and when the weights 54 are nearer the other end of the frame 50 larger loads can accumulate each cycle. This adjustment can be made quickly and accurately.

Figure 4:
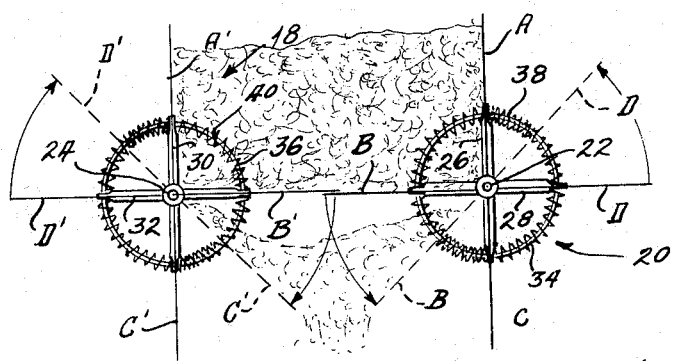
FIG. 4 is a diagrammatic view illustrating several different positions of the feed weighing and supporting elements of the subject device.

FIG. 4 shows the amount of relative movement between the paddle wheel blades during an unloading operation as aforesaid. FIG. 4 also illustrates the relationship of the cross arm members 26, 28, 30 and 32 and the various conditions of the springs 38 and 40 during unloading.

The frame 42 on which the assemblies 18 and 20 are mounted also carries the vertical walls 21 which are spaced inwardly from the associated side walls of the housing 12. These walls define feed free spaces in which the various operating mechanisms are located. The wall members 21 are also adjacent to the side edges of the assembly blades and help define the weighing cavity.

FIG. 6 shows the subject feed weighing device 10 in combination with an auxiliary device 100 which supplies a feed supplement to the incoming bulk feed material to produce a more desirable feed mixture. The auxiliary device 100 weighs out predetermined amounts of a feed supplement and at an appropriate time, feeds the said predetermined amount to the device 10 where it is blended and mixed with the bulk feed before the bulk feed is released to fall into the feed trough. The auxiliary means are mounted on the side of the input feed chute 102 to the device 10, and more than one similar feed supplement device can be provided as desired for supplying measured amounts of several different supplements. The auxiliary device 100 like the main feed weighing device 10 can be fully automatic requiring only minimum attention by an operator such as for purposes of refilling the supply bins therefor, adjusting the amount of feed supplement to be added to each batch of bulk feed, and general cleaning and maintaining said device as required. The device 100 can also be used independently of the device 10, as for example, as a hog feeder.

The feed supplement device 100 is shown mounted over a sloping chute 104 which is attached to the side of the main chute 102 and empties into the main chute 102. The device 100 includes upper and lower housing portions 106 and 108 respectively, and the upper housing portion 106 is open at the top to receive feed supplement fed thereto by an auger device 110 which has a discharge opening 112 thereabove. The auger feed device 110 may be of conventional construction having a rotatable helical auger mounted in a tube, and the lower end of the feed device or tube 110 is positioned near the bottom of a suitable supply bin that contains bulk supplement. The auger for the feed device is driven by a motor 114 and by suitable gears 116 and 118.

The upper housing portion 106 also has a pair of sloping bottom shutters walls 120 and 122 positioned therein as shown in FIG. 7. The shutters slide on space ledges 123 in the housing 106, and when the walls 120 and 122 are in the position shown in solid outline in FIG. 7 the bottom of the housing portion 106 is closed and when the shutters are in the dotted position the bottom of the housing portion 106 is open. The ledge members 123 can also be formed of sloping portions to facilitate sliding movement of the shutter members 120 and 122 therealong. When a predetermined amount of feed supplement is fed into the upper housing portion 106 by the auger 110, weighing means will be actuated to energize means that move shutter walls 120 and 122 to the position shown in the dotted outline in FIG. 7. The feed supplement will then fall into the lower housing portion 108 onto a pair of semi-cylindrical shaped shutter members 124 and 126 which close the bottom thereof. The shutter members 120 and 122 are controlled by two solenoid operators 128 and 130 which are mounted on the sides of the housing portion 106. The solenoid operator 128 has an armature 132 which is connected to one end of a shaft 134 that is movable in curved slots in the ends of the housing portion 106, and is also hingedly connected to adjacent upper side edges of the shutter wall members 120 and 122. When the solenoid 128 is energized the armature 132 moves the shaft 134 upwardly in the housing 106 to the dotted position in FIG. 7 and in so doing discharges feed supplement into the lower housing portion 108. The shutters 120 and 122 also keep a supply of the supplement available in the upper housing 106 so that the auger motor 114 does not have to be restarted each time a new amount of supplement is to be weighed in the lower housing 108. The shutters also give a clean cutoff of the supplement after each weighing operation is satisfied thereby preventing waste and facilitating more accurate weighing.

The solenoid operator 130 is mounted on one side of the housing 106 and has an armature 136 that is connected to a U-shaped equalizer bracket member 138. The bracket 138 is pivoted to the housing portion 106 at points 140 and 142, and is also connected to opposite ends of the shaft 134. When the solenoid 130 is energized, it moves the connected portion of the U-shaped member 138 upwardly thereby forcing the shaft 134 downwardly to reclose the bottom of the upper housing portion 106 in readiness for the next weighing operation. The solenoid 128 therefore controls the opening of the housing portion 106 and the solenoid 130 controls the closing thereof. The control circuits for the solenoids 128 and 130 will be described later in connection with FIG. 8.

Another solenoid 144 is mounted on the end wall of the lower housing portion 108 and its armature 146 is eccentrically connected to two rotatable shutter members 124 and 126 which open and close the bottom thereof. The solenoid 144 has two operating coils 145 and 147 one of which is energized to close the shutter members 124 and 126 and the other to open the shutter members. When the solenoid coil 145 is energized armature 146 moves upwardly rotating the eccentric connections thereof with the shutters 124 and 126 and moving the shutters to their closed positions. When the solenoid coil 147 is energized, however, the armature 146 moves downwardly to open the shutters to allow the contents of the lower housing 108 to discharge into the chutes 102 and 104. It is also contemplated to mount the shutters 124 and 126 in reverse positions on the housing 108 so that their outer surfaces instead of their inner surfaces close the bottom thereof and support the load. The operating mechanism for this reverse condition can be similar to that disclosed and therefore need not be described.

The bottom housing portion 108 is supported by suitable weighing means such as pivoted levers 148 and weights 149 as shown in FIG. 6. The housing portion 108 also operates certain limit switches which will be described later and which control the operation of the solenoids 128, 130 and 144.

The device 100 can be operated at any time to measure or weigh a predetermined quantity of feed supplement, and can also be controlled as to when the feed supplement will be fed into the feed weigher device 10. Normally, the most desirable time to empty the feed supplement into the feed weighing device 10 is when the device 10 is approximately half full because then the supplement will be fairly near the middle of the bulk feed and will better distribute itself therewith when the bulk feed falls through the outlet 16. It is also contemplated to provide a rotating paddle wheel or mixing device (not shown) in the outlet chute to the feed weigher 10 to even more thoroughly mix the feed supplement with the bulk feed.

As already noted the feed supplement weighing device can also be operated with other weighing devices or independently, if desired. In such cases, some structural and electrical changes may be required and some components, such as the operator 130 and associated parts may be eliminated or relocated. For example, the operator 130 could be replaced by a suitable weight device attached to the member 138 to close the shutter members 120 and 122 under certain conditions. Other changes can also be made.

FIG. 8 shows a circuit for operating the feed weigher devices 10 and 100. The circuit is connected to an appropriate source of voltage and includes circuits to operate the solenoids 128, 130 and 144, the auger 110, and another similar auger device (not shown) which controls the input of bulk feed to the main feed weigher 10. The circuit may also include a sequence relay and a timing device. Operation of the circuit is controlled by mechanical limit switches positioned to respond to predetermined movements of the various mechanisms. If the device 10 is to be used without supplement additive means a simpler circuit than is shown in FIG. 8 can be used involving merely timing means and switch means for controlling the bulk feed source.

Initiation of an operating cycle where both the devices 10 and 100 are employed is more complicated and is controlled by a timing device (not shown) which closes a switch (not shown) from a power source to the present circuit. The timing device can be of conventional construction and can be energized to initiate the circuit on any preset schedule. Once the circuit is energized a sequence relay 150 and a plurality of limit switches take over to automatically feed and weigh a predetermined quantity of bulk feed which may be mixed with one or more feed supplements. The mixture is then fed to a manger or other feed trough. At the beginning of each operation, the auger from the silo or such to the main feed weigher device 10 is energized to feed bulk feed to the main weigher device 10. At this time, a normally open switch, which is now closed because the weigher 10 is empty, establishes a circuit for energizing coil 157 of a sequence relay 150. By so doing, a movable relay contact 156 moves into engagement with a stationary contact relay 158 and establishes circuits for energizing solenoid coils 128 and 145 and the auger motor 114. Thus when the auger motor 114 starts the solenoid 128 opens the shutters 120 and 122 and allows the incoming supplement to pass through into the weigher housing 108 which is now closed at the bottom. This continues until such time as the weighing means associated therewith are satisfied that the desired amount of supplement is in the housing 108 at which time the shutters 120 and 122 will be closed and thereafter the auger motor will be deenergized.

The circuit for energizing the motor 114 is from the main power source on leads 152 and 154 to the sequence relay terminal 156 which is now connected to the relay terminal 158 because the relay coil 157 was last energized and the relay has only two alternate operating positions, then on lead 160 to and through the normally closed limit switch contacts 162 which are in series with the auger motor 114, and back on lead 164 to the opposite side of the voltage source. This causes feed supplement to be fed into the device 100. At the same time, the shutter members 120 and 122 in the upper stationary housing portion 106 are open because the solenoid 128 is energized, being connected in parallel across a circuit which includes the auger motor 114 and the normally closed limit switch contact 162. This allows the incoming feed supplement to fall through the upper housing portion 106 into the lower housing portion 108 as aforesaid and onto the shutter members 124 and 126 which are now closed because the solenoid 145 is also energized being connected in parallel with the solenoid coil 128. The circuit that energizes the solenoid 145 includes leads 152 and 154, relay terminals 156 and 158 which are closed, leads 160 and 166, to and through the solenoid coil 145 and back to the opposite side of the voltage source on lead 164. This continues until the normally closed limit switch 162 is opened due to predetermined downward movement of the lower housing portion 108 as feed supplement accumulates therein. When the limit switch 162 is actuated by predetermined downward movement of the housing portion 108 the auger 114 will stop. The stopping of the auger motor 114 need not occur exactly at the time that the housing portion 108 has the predetermined measured amount of feed in it but preferably will continue to operate for a longer time to partially fill the upper housing portion 106 even after the shutters 120 and 122 are closed.

When the housing portion 108 is in its predetermined filled condition as determined by the weighing means including limit switches 168 and 170 associated therewith, the solenoid 130 will be energized to close the shutters 120 and 122 and thereafter the auger motor 114 will stop. The device 100 will then wait for the appropriate time to discharge its load. The appropriate time in the present device occurs when the device 10 is approximately one-half full of bulk feed as determined by actuation of a normally closed one-half full limit switch 172 which is positioned on the device 10 and controlled by movement of the weighing arm assembly 46. The contacts of the limit switch 172 are also adjusted to close when the device 10 is approximately half loaded and are connected in series with the limit switch 168 which at the time is also closed because of the full condition of the housing portion 108. When these two conditions exist a circuit is established on lead 174, the contacts of limit switch 172, lead 176, the contacts of the limit switch contacts 168, and lead 178 to and through relay winding 180 of the sequence relay 150. The energizing of the relay winding 180 causes the movable relay terminal 156 to move from its position contacting the stationary terminal 158 to its other position contacting stationary terminal 182 to establish a circuit from the source on leads 152 and 154 to the terminals 156 and 182, lead 184 to the weigher solenoid trip coil 147 which is mounted on the solenoid 144. When the solenoid trip coil 147 is energized it opens the movable shutters 124 and 126 at the bottom of housing portion 108 and discharges the previously measured quantity of feed supplement into the chutes 102 and 104. This occurs, as already mentioned, when the main weigher device 10 is approximately half full.

Prior to the time that the coil of the trip weigher solenoid 147 is energized, another circuit is established through the normally opened limit switch 170 to close the shutters 120 and 122 in the upper housing portion 106. This circuit is from the source on leads 152 and 154 to and through the contacts of limit switch 170 which are now closed and then on lead 186 to and through the closed shutter solenoid 130 and back to the voltage source on the lead 164.

Thereafter, after the device 10 has been emptied by operation of the weighing means 45, a normally open limit switch 188 under control of the weighing means 46 will be closed to establish a circuit for reenergizing the sequence relay coil 157 to reset the relay 150 in preparation for the next succeeding cycle. The sequence relay is constructed to remain in the condition in which it was last energized until the other coil thereof is energized. The limit switch 188 is actuated by the weighing means 46 after they have returned to their empty position at the conclusion of an unloading operation. The locations of the switches 168 and 188 are shown in FIG. 6.

The auger motor 114 and the shutter open solenoid 128 will be reenergized by the reclosing of the normally closed limit switch 162 after the device 10 is empty in preparation for the next cycle. After the lower housing portion 108 has been filled the shutters 120 and 122 may again be closed by the contacts of the limit switch 170 and the operation will not be repeated until the next time the auger for the main weigher device is energized under control of a timing means.

As already noted, the entire sequence of operation is carefully controlled and timed by the sequence relay, the limit switches and timing means all of which can be adjusted to produce the most desirable operation conditions. It should also be noted that the various parts of the subject circuit are fully interlocked to prevent malfunction should trouble develop. This is highly desirable in a device such as this where waste could otherwise occur rapidly. Many variations and changes in the circuit, in the circuit timing, and in the method and sequence of operation are possible and are clearly within the scope of the invention, and it is not intended to limit the invention to the particular embodiment and the particular operation and sequence of operation hereinabove disclosed.

Thus there has been shown and described novel feed weighing means which fulfill all of the objects and advantages sought therefor. Many changes, modifications and alternations of the subject device, however, will become apparent to those skilled in the art after considering this specification and the accompanying drawings which disclose only preferred embodiments thereof. All such changes, modifications and alterations which do not depart from the spirit and scope of the invention are deemed to be covered by the invention which is limited only by the claims which follow.

What is claimed is:

1. A feed weigher device for livestock and the like comprising a housing having an inlet feed chute thereto and an outlet feed chute therefrom, means positioned in said housing for receiving and accumulating predetermined quantities of feed, said means including weighing means, said receiving and accumulating means including a pair of rotatable members having blade portions which cooperate in different positions thereof to define a chamber in the housing in which the feed from the inlet accumulates, and means for releasing said feed accumulating means to discharge the predetermined quantities of feed into the outlet chute.

2. The feed weigher device defined in claim 1 wherein said rotatable members are supported in the housing in suspended condition by the said weighing means.

3. The feed weigher device defined in claim 1 wherein said weighing means includes a movable weighing assembly connected to the rotatable members to counterbalance the weight thereof during loading.

4. Means for feeding predetermined quantities of feed at predetermined time intervals to livestock and the like comprising a housing having a feed inlet adapted to be connected to a controlled source of feed, a feed outlet adapted to be connected to a livestock feed trough or the like, means positioned in the housing to receive and accumulate feed fed through the inlet, said last named means including a pair of rotatable members each having blades which cooperate in different positions thereof to define a feed accumulating chamber in the housing, weighing means pivotally connected to the said rotatable members and movable relative thereto during movement of feed into the feed chamber to counterbalance the various loaded conditions of the rotatable members, and means for releasing the rotatable members under predetermined load conditions to permit the load thereon to fall into the outlet, said release means including means engageable with the rotatable members and operatively connected to the weighing means.

5. The means defined in claim 4 wherein said release means include means for deactuating the controlled feed source.

6 means for blending, mixing, weighing and feeding predetermined quantities of feed for livestock and the like comprising a main housing having an inlet adapted to be connected to a controlled source of bulk feed, an outlet adapted to be connected to a feed trough or the like, a pair of rotatable members positioned in said main housing, each of said members having blade portions which cooperate to define a chamber in the housing for accumulating feed that enters through the inlet, means for supporting the rotatable members including weighing means pivotally connected thereto, said weighing means including counterbalance means movable in opposition to changes in the load on the rotatable members, means normally urging the blades of each of the rotatable members into a predetermined angular relationship, said relationship changing as the load on the rotatable members changes, and means for releasing the rotatable members under predetermined load conditions to release the load thereon so that it can fall into the outlet, said release means including means engageable with the rotatable members and other means operatively connected to the weighing means.

7. The means defined in claim 6 wherein said inlet is provided with an auxiliary feed weigher device for feeding measured quantities of a different feed material into the accumulating chamber and onto the rotatable members, said auxiliary device including an auxiliary housing having an inlet adapted to be fed feed material from another controlled feed source, an outlet adapted to be connected to the inlet of the main housing, and means for weighing feed in said auxiliary housing, said last named weighing means including means responsive to a predetermined weight condition for deactuating the associated controlled feed source, and other means for thereafter releasing said predetermined quantity of feed to the aforesaid accumulating chamber in the main housing in response to a predetermined weight condition of feed in the main housing.

8. The means defined in claim 7 wherein said weighing means associated with the main and auxiliary housings include limit switches positioned to operate under predetermined load conditions.

9. Means for blending, mixing, weighing and feeding predetermined quantities of feed and feed supplements to livestock and the like comprising a housing having an inlet adapted to be connected to a controlled source of bulk feed, an outlet adapted to be connected to a feed trough or the like, a pair of rotatable members positioned in said housing, each of said members having blade portions which cooperate in predetermined positions thereof to define a chamber in the housing for accumulating feed entering through the inlet, means for supporting the rotatable members in the housing including weighing means pivotally connected thereto, said weighing means including counterbalance means movable in opposition to the load on the rotatable members and including a pair of pivotal members movable to an overcenter condition during loading of the rotatable members when a predetermined amount of feed has accumulated thereon, release means operatively connected to said weighing means and engageable with said rotatable members to prevent release of the rotatable members until the predetermined amount of feed has accumulated thereon, and means associated with each of said rotatable members enabling certain blade portions thereof to move relative to other blade portions to increase the volumetric capacity of the chamber during unloading in order to prevent compacting of the feed materials.

10. Means for blending, mixing, weighing and feeding predetermined quantities of a bulk feed material and a feed supplement to livestock and the like comprising a main housing having an inlet adapted to be connected to a controlled source of bulk feed, an outlet for feeding a feed trough or the like, a pair of rotatable members positioned in said main housing, each of said members having blade portions which cooperate in predetermined positions to define a chamber in the housing for accumulating bulk feed and feed supplement, means for supporting the rotatable members in the housing including weighing means pivotally connected thereto and normally counterbalancing the said rotatable members and the weight of the feed on the blade portions thereof, said weighing means moving to an overcenter condition when a predetermined amount of feed is on the rotatable members, release means operatively connected to said weighing means and engageable with said rotatable members to prevent rotation thereof until said predetermined amount of bulk feed and supplement has accumulated thereon, said release means releasing the rotatable members to discharge the accumulated bulk feed and feed supplement into the outlet when the weighing means move to the overcenter condition, and auxiliary means associated with the inlet to the main housing for weighing predetermined quantities of feed supplement, said last named means including a controlled source for feeding feed supplement to said auxiliary weighing means, an outlet communicating with the auxiliary weighing means with the weighing chamber in the main housing, release means for said auxiliary weighing means for releasing measured quantities of feed supplement into the main housing, and electric control means including separate switch means responsive to the auxiliary weighing means and to the weighing means associated with the main housing for controlling the sequence and timing of the feeding, weighing and releasing operations.

11. Means for weighing predetermined quantities of feed or the like comprising a housing having an inlet adapted to be connected to a controlled feed source and an outlet adapted to be connected to a trough or the like, means positioned in said housing for receiving and accumulating feed from the inlet, said last named means including means for weighing and accumulating feed, said feed accumulating means including a pair of rotatable members each having a plurality of blade portions which cooperate in different positions thereof to define a chamber in the housing for accumulating feed, and means for releasing said accumulated feed to the outlet when a predetermined amount of feed has accumulated.

12. The means defined in claim 11 wherein said feed release means includes means engageable with said rotatable members to prevent rotation thereof until a predetermined amount of feed accumulates thereon, and means responsive to the accumulation of said predetermined amount of feed to actuate said release means to release said rotatable members for rotation to positions in which the accumulated feed falls into the outlet.

13. The means defined in claim 11 wherein said release means are operatively connected to said weighing means.

14. The means defined in claim 11 wherein an auxiliary feed device is mounted in association with the inlet, said auxiliary feed device including an inlet adapted to be connected to a second controlled feed source, an outlet adapted to discharge feed into the inlet of the aforesaid housing, means on said auxiliary feed device for receiving and accumulating predetermined quantities of feed from said other feed source, and means responsive to a predetermined weight of accumulated feed in said auxiliary feed device for conditioning said auxiliary feed device so that it can thereafter be controlled to discharge into the inlet of the aforesaid housing.

15. Means for weighing predetermined amounts of feed material or the like comprising a first housing including an inlet, a controlled inlet feed means for feeding material into the first housing, a second housing movable relative to the first housing and positioned to receive and accumulate feed material fed into said first housing, said second housing being positioned in the first housing, means associated with said second housing for weighing feed material as it accumulates therein, said weighing means including means for supporting said second housing for vertical movement relative to the first housing, and means including electrical control means for controllably releasing material accumulated in said second housing at variable predetermined time intervals and in response to the accumulation of a predetermined weight of material therein as determined by the weighing means, said electrical control means also including means for controlling the inlet feed means.

References Cited by the Examiner

UNITED STATES PATENTS

| 1,468,303 | 9/1923 | King et al. | 222—503 |
| 1,668,324 | 5/1928 | Kriesinger | 222—503 |
| 2,098,246 | 11/1937 | Jarrier | 177—120 X |
| 2,299,636 | 10/1942 | Mansbendel | 177—85 |
| 2,568,253 | 9/1951 | Porter | 177—85 |
| 2,624,538 | 1/1953 | Schrock et al. | 177—87 |
| 2,717,143 | 9/1955 | McCargar | 177—85 |

FOREIGN PATENTS

| 649,657 | 10/1962 | Canada. |
| 1,272,205 | 8/1961 | France. |
| 952,365 | 3/1964 | Great Britain. |

LOUIS J. CAPOZI, *Primary Examiner.*

LEO SMILOW, *Examiner.*

G. J. PORTER, *Assistant Examiner.*